Jan. 13, 1942.　　　M. G. KURTH　　　2,269,944
PISTON RING
Filed Nov. 9, 1938
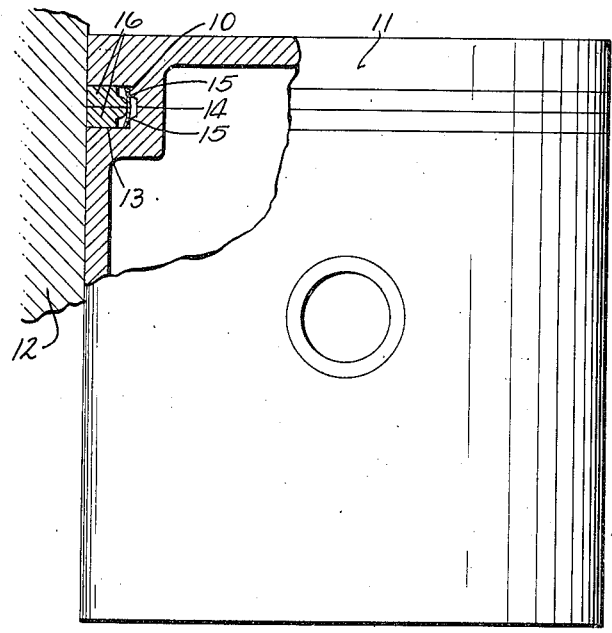
Fig. 1.
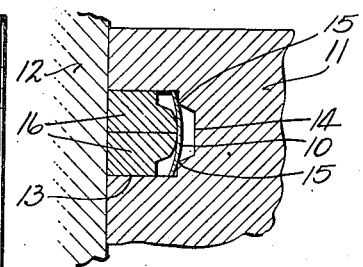
Fig. 2.
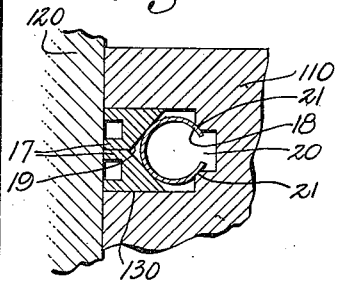
Fig. 3.
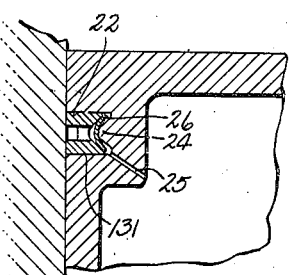
Fig. 4.
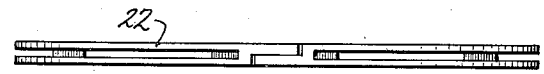
Fig. 5.
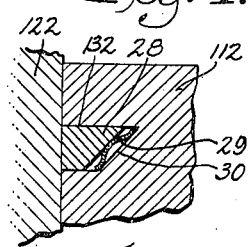
Fig. 8.
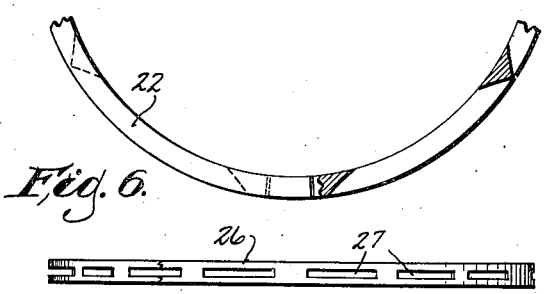
Fig. 6.
Fig. 7.
Fig. 9.
INVENTOR.
MATTHEW G. KURTH
BY
Wheeler, Wheeler & Wheeler
ATTORNEYS Patented Jan. 13, 1942

2,269,944

UNITED STATES PATENT OFFICE 2,269,944

PISTON RING

Matthew G. Kurth, Madison, Wis., assignor to Five Point Seal Corporation, Oregon, Wis., a corporation of Wisconsin Application November 9, 1938, Serial No. 239,653

9 Claims. (Cl. 309—7)

This invention relates to improvements in piston rings.

The object of my invention is to provide novel and improved means whereby I obtain a positive seal which prevents oil from working around a packing ring, without undue bearing pressure on the wall packed by said ring.

I have found that in the conventional type piston packing there are passages through which oil enters and works around the ring. While these passages exist momentarily, being alternately formed between the ring and the walls of its groove as the ring is forced alternately against said walls, oil works about the ring in consequence thereof. By means of a seal at the back of the ring this by-pass of oil around the ring is stopped.

While attempts have been made to provide a seal between an inner ring or spring expander and an outer ring of expansion type, pressure between these members must necessarily be limited due to the pressure exerted thereby resulting in a proportional increase in the pressure between the outer packing ring and the cylinder walls. To accomplish my objective I use in combination a contractile ring and an expansion ring or spring, said combination enabling me to provide a heavy spring pressure between the rings and still maintain a normal or even a reduced pressure between the outer ring and the cylinder wall.

A further object is to provide a packing embodying the above described principles and to provide means whereby the packing ring is subject to a constant axial pressure, said ring being thereby thrust against a channel side wall to provide an additional oil seal.

It is understood that the embodiments of my invention herein described are merely illustrative of the principles, and I claim all other embodiments which reasonably fall within the spirit and scope of my invention.

In the drawing:

Fig. 1 is a view partially in perspective and partially sectional along the vertical axis of a piston, and showing an embodiment of the invention.

Fig. 2 is a fragmentary view in vertical axial section and represents an enlargement of the inventive features.

Fig. 3 shows a fragmentary view in axial section of an alternative application of the invention.

Fig. 4 is a fragmentary view in vertical axial section of an embodiment of the principle to a ring of the oil drainage type.

Fig. 5 is a view in side elevation of an oil type seal and expansion ring.

Fig. 6 is a plan view of the ring shown in Fig. 5.

Fig. 7 is a side elevation of the inner ring or piston ring expander, as shown at 10 in Figs. 1, 2 and 4.

Fig. 8 is a fragmentary view in vertical axial section of a further embodiment of the principles Fig. 9 is a view partially in side elevation and partially in section, of the inner spring or ring expander shown Like parts are identified by the same reference characters throughout the several views.

While either the cylinder or the piston may carry the packing, I have shown, by way of example, in Figs. 1 and 2, a conventional piston 11 operating in a cylinder, the side wall of which is shown at 12. Piston 11 has an annular groove 13 which is provided with an annularly channeled inner wall contour 14 with shoulders at 15. Annular expansion spring 10, arched transversely in relation to the annulus thereof, rests against the shoulders 15, and a single or duplex packing ring 16 of contractile type exerts pressure against the axial center portion of spring 10. The inner periphery of packing 16 is provided with a projecting rib positioned midway between the shoulders 15 of groove 13. It is seen that contractile pressure of ring 16, supplemented by the cylinder wall pressure, will tend to flex spring 10 in a direction transverse with respect to the annulus, and that the resistance of the spring to transverse flexion is greatly enhanced by its peripheral arc. A spring formed in this manner has greater resilience in relation to its dimensions and is less affected as to such resilience by heat.

Fig. 3 represents a further embodiment of my invention. The duplex packing ring 17 comprises elements provided at their inner peripheries 19 with divergent walls having bearing zones and which form a recess in which annular spring 18, of split-ring cross section, is disposed in pressure engagement with ring 17. The open portion of spring 18 is disposed in groove 20 of member 110, with free ends resting on shoulders 21 which provide bearing zones therefor on the piston. Annular spring 18 is thus confined under pressure, the diameter of spring 18, as well as the cross sectional diameter, varying with a variation of pressure between cylinder 120 and piston 110. Spring 18 under stress transmits pressure to the divergent walls 19 of the elements comprising ring 17 in directions which in the present device are substantially normal to the beveled faces 19 of the packing elements diagonally opposite the lines of bearing support of the spring on shoulder 18. Hence an axial as well as a radial component of force acts on each element of ring 17 to provide an additional oil seal by means of the resultant pressure engagement between the outer side walls of the respective elements of the duplex ring 17 and the thrust surfaces of channel 130.

A ring 22 of the type known as an oil ring, designed to return oil to the crank case, is employed in the embodiment shown in Figs. 4, 5 and 6. The contractile pressure of ring 22 flexes spring 26 between the channeled inner periphery of ring 22 and the annular rib 24 which forms the inner wall of the piston ring groove 131. This arrangement is the converse of that shown in Figs. 1 and 2. Spring 26 is provided with a series of openings 27 which extend around the circumference thereof and provide means of escape for oil, which is drained through the usual bores 25 to the interior of the piston to re-enter the crank case.

In Figs. 8 and 9 the annular ring groove 132 is provided with an interior wall 30 in oblique relation to the grooved side walls, and the inner periphery of ring 28 is in a similar angular relation to the sides of the ring. Between these respective oblique surfaces is disposed spring 29, each peripheral edge of which is flanged to rest in contact with inner wall 30 of piston channel 132, the intermediate portion of said spring being ribbed outwardly to contact the inner periphery of ring 28. The pressure engagement of piston 112 and cylinder 122 plus the contractile pressure of ring 28 deforms spring 29 inwardly to reduce the transverse arc of its peripheral rib. The resulting resilient pressure of spring 29, applied to the angular inner periphery of ring 28 has,— in addition to the usual radial thrust, an upward component of force which results in a tight engagement of the top surface of ring 28 and the top thrust surface of channel 131, thereby providing an oil seal which effectively prohibits oil from working around the ring.

In each of the various devices disclosed there is an annular packing ring supported by an annular spring and in each instance the spring comprises a split ring not only arcuately curved to lie in the groove, but also arcuately curved in cross section in a plane transverse with respect to its periphery.

Also, in each form of packing herein disclosed, the factor which determines the bearing pressure is a constant. The outer contractile member, whether integral or annularly divided, is the only one subject to wear. Its contractile force is weakened by wear, but the expansive force of the sealing member is constant, that member being substantially free from wear and having sufficient expansive force to establish the desired pressure differential. The differential pressure increases as the bearing ring or rings become weakened by wear, and this is desirable, since the difficulty of keeping these rings in sealing contact increases, particularly in internal combustion engines, wherein the thrust pressures tend to cause the cylinders to become slightly oval in cross section. I believe I am the first to provide a piston packing, the effective bearing pressure of which increases with wear, and the sealing pressure of which, within the bearing ring or rings, remains substantially constant notwithstanding the progressive enlargement of the space between the bearing rings and the base of the groove.

In the case of the construction shown in Fig. 1 and Fig. 2, the spring may constitute a ribbon having no initial transverse curvature but it acquires transverse curvature when subjected to pressure in the assembly shown in the construction illustrated in Fig. 4. In the other constructions herein disclosed the spring is preferably formed in advance to provide some arcuate curvature in cross section. In any case, the fact that the spring has both peripheral and transverse curvatures makes it peculiarly adapted for use in a packing assembly as above explained.

While I have shown my improved packing applied to the exterior of the piston, it will readily be understood by those skilled in the art how the converse arrangement could be applied to the cylinder, if the cylinder, rather than the piston, is to be the packed member.

I claim:

1. A packing ring for annular grooved surfaces, comprising a set of concentric packing members of resilient metal, biased for pressure contact in opposite directions, one of said members having a bearing surface of a width substantially equal to the groove which the ring is designed to fit, and the other of said members being adapted to serve as an oil seal in contact with the walls of the groove and with the first mentioned member and being also capable of resilient pressure in excess of the counter pressure of the first mentioned member, whereby to provide a constant force determinative of the bearing pressure, each of said members having surfaces divergent from each other at opposite sides of a central radial plane and the said surfaces of one member being convergent to the said surfaces of the other member for annular sealing contact with each other on opposite sides of said plane.

2. A piston provided with a packing ring groove, in combination with a set of resilient annular members encircling the piston in said groove and including an inner seal biased for expansion and an outer packing biased for contraction upon the seal, said outer packing having a peripheral bearing surface substantially equal to the width of the groove and the seal having sufficient expansive force to overcome the contractile force of the packing and determine the degree of its pressure upon the opposing bearing surface, said seal also having portions in sealing relation to the packing and to the walls of the groove, adapted to effectively prevent oil leakage.

3. The packing described in claim 1, in which the outer packing member and sealing pressure ring have bearing surfaces of greater sealing effectiveness than single line pressure contacts.

4. The packing described in claim 1, in which the sealing member and piston surfaces have annular bearing contacts of substantial width.

5. The packing described in claim 2, in which the packing is divided annularly and the members are contoured to provide mutually contacting surfaces adapted to convert the pressure of the sealing member into radial and axial components of force, tending to press the respective portions of the bearing member against the walls of the groove while forcing their peripheral surfaces outwardly.

6. A piston provided with a packing ring groove, in combination with a split oil ring having arcuate slots in which oil may collect and through which it may drain into said groove, said ring being biased for contraction, an inner sealing ring biased for expansion and having annular sealing contacts with the walls of the groove and the oil ring, said sealing ring having sufficient expansive force to overcome the contractile force of the oil ring and determine the degree of its pressure upon the opposing bearing surface of the cylinder wall.

7. A piston provided with a packing ring groove, in combination with a split oil ring having arcuate slots in which oil may collect and through which it may drain into said groove, and a sealing ring having its longitudinal central portion in concavo-convex bearing contact with the base portion of the groove and its marginal portions in substantially flat bearing contact with the oil ring near the respective sides thereof.

8. A piston provided with a packing ring groove, in combination with a set of resilient split packing ring members having peripheral cylindrical bearing surfaces and inner surfaces divergent from a central radial plane normal to the piston axis, and a tubular split sealing ring composed of resilient metal having portions in pressure contact with the divergent inner walls of the packing ring members and other portions in contact with portions of the base of the groove of substantial width, said packing ring members being biased for contraction and said sealing ring being biased for expansion with greater force than the contractile force of the bearing rings.

9. Packing for annularly grooved surfaces, said packing comprising a set of concentric annular packing members of resilient material biased for pressure contact in opposite directions, the packing outermost in the groove comprising at least one contractile ring subject to wear and the inner packing comprising at least one expanding ring substantially free from wear and adapted to exert substantially constant counter pressure outwardly upon the outer packing in excess of the contractile pressure of the outer packing, whereby to provide a constant force determinative of the differential bearing pressure and of increased relative effectiveness as the outer packing becomes worn, the inner packing ring and the outer packing ring aforesaid having bearing contact with each other and at least one of said rings having for the purpose of such contact a bearing surface obliquely directed with respect to a central radial plane through said concentric packing members, the pressure of the said inner packing ring and outer packing ring upon each other being exerted both axially and radially by reason of the oblique direction of such surface, whereby to maintain continuous sealing pressure betwen rings in an axial as well as a radial direction.

MATTHEW G. KURTH.